Figure 1:
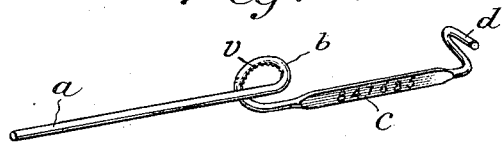

W. M. BROOKS.
BAG SEAL.
APPLICATION FILED MAY 14, 1915.

1,150,336.

Patented Aug. 17, 1915.

Inventor:
Winfred Mudge Brooks
By Wm. Ers Lamb
Atty.

COLUMBIA PLANOGRAPH CO., WASHINGTON, D. C.

UNITED STATES PATENT OFFICE.

WINFRED MUDGE BROOKS, OF EAST ORANGE, NEW JERSEY, ASSIGNOR TO E. J. BROOKS & CO., OF NEW YORK, N. Y., A CORPORATION OF NEW YORK.

BAG-SEAL.

1,150,336.   Specification of Letters Patent.   Patented Aug. 17, 1915.

Application filed May 14, 1915. Serial No. 28,063.

*To all whom it may concern:*

Be it known that I, WINFRED MUDGE BROOKS, a citizen of the United States of America, and a resident of East Orange, in the State of New Jersey, have invented a new and useful Improvement in Bag-Seals, of which the following is a specification.

This invention relates to seals for bags, cordage and similar purposes and comprises novel means for securely fastening the cords and at the same time sealing them so that any attempt to tamper with the fastener will be certainly disclosed while the seal is at the same time guarded against accidental injury. The device lends itself readily to the use of identifying marks such as serial numbers, trade-marks, etc., which make substitution impracticable and can be further utilized for connecting identifying tags to the article with security.

One sheet of drawings accompanies this specification as part thereof, in which like reference characters refer to like parts throughout.

Figure 4:
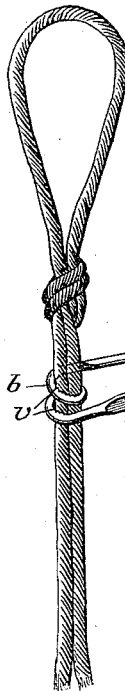
Figure 5:
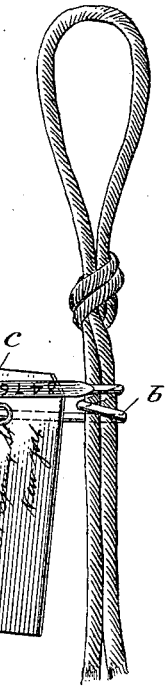
Figure 2:
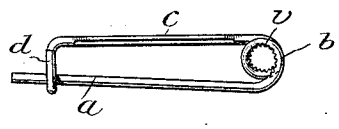
Figure 6:
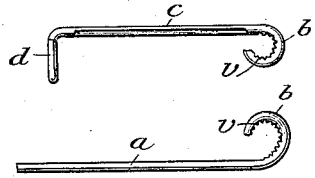
Figure 3:
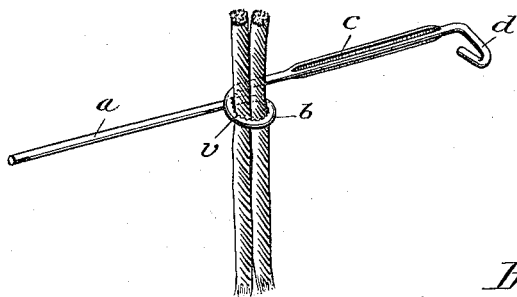

Figure 1 shows the seal as it leaves the factory, with a serial number embossed upon its body; Fig. 2 shows the seal fastened; Fig. 3 shows the seal slipped over two cords preparatory to fastening and sealing; Fig. 4 shows the seal fastened upon two cords; Fig. 5 shows the seal bearing a consignment tag, sealed upon two cords and Fig. 6 shows a seal fractured by an attempt to unfasten.

Referring to the drawings, *a* represents the fastening and sealing shank of the seal; *b* the fastening and sealing coil; *v* transverse notches cut into the inner side of the sealing coil; *c* the flattened body portion embossed with a serial number and *d* a catch or guard for the protection of the fastening and sealing shank and sealing coil.

In operation the seal is slipped over the ends of the cords which are to be secured and sealed, a consignment tag if one is to be used is slipped over the fastening and sealing shank and the latter is then bent firmly around toward the body of the seal, thus compressing the sealing coil on the cords, until its end is sprung into the catch or guard. The transverse notches *v* cut into the inner side of the sealing coil are pressed into the fiber of the cords producing an extremely tight fastening and upon any attempt to remove the seal by unbending the coil, said cuts invariably produce a fracture with resulting disclosure of the attempt at tampering. Accidental unbending is prevented by the guard.

Modifications in shape and size will readily suggest themselves according to the particular use in hand.

Having thus fully disclosed my invention, I claim:

1. A bag or cordage seal having in combination a body portion, a fastening and sealing coil adjacent to one end thereof, having transverse notches cut into the inner side of said coil adapted to produce a fracture thereof by any attempt to uncoil it, means for further coiling and tightening said coil and means for guarding said coil against accidental uncoiling.

2. A bag or cordage seal, having in combination a body portion, a fastening and sealing coil adjacent to and integral with one end thereof, a V shaped hook adjacent to and integral with the other end thereof and at right angles thereto and a shank continuation of said sealing coil, adapted to further coil and tighten said coil and by engaging with said hook to be protected against accidental unbending.

3. In a bag or cordage seal of wire, a flattened and embossed body portion, a fastening and sealing coil adjacent to and integral with one end thereof, transverse notches cut in the inner side of said coil, a shank continuation of said coil and a V shaped hook adjacent to and integral with said body portion and at right angles thereto, all substantially as hereinbefore specified.

WINFRED MUDGE BROOKS.

Witnesses:
ELLA LINDSAY,
MONTGOMERY LINDSAY.

Copies of this patent may be obtained for five cents each, by addressing the "Commissioner of Patents, Washington, D. C."